TRANSMITTER FREQUENCY CONTROL

Filed July 19, 1955

2 Sheets-Sheet 1

INVENTOR.

CRAIG L. WHITMAN

BY

[signature]

ATTORNEY

TRANSMITTER FREQUENCY CONTROL

Filed July 19, 1955 2 Sheets-Sheet 2

INVENTOR.
CRAIG L. WHITMAN
BY F. A. Rechif
ATTORNEY

United States Patent Office 2,901,597 Patented Aug. 25, 1959

2,901,597

TRANSMITTER FREQUENCY CONTROL

Craig L. Whitman, Moorestown, N.J., assignor, by mesne assignments, to the United States of America as represented by the Secretary of the Army Application July 19, 1955, Serial No. 523,015

5 Claims. (Cl. 250—13)

Figure 1A:
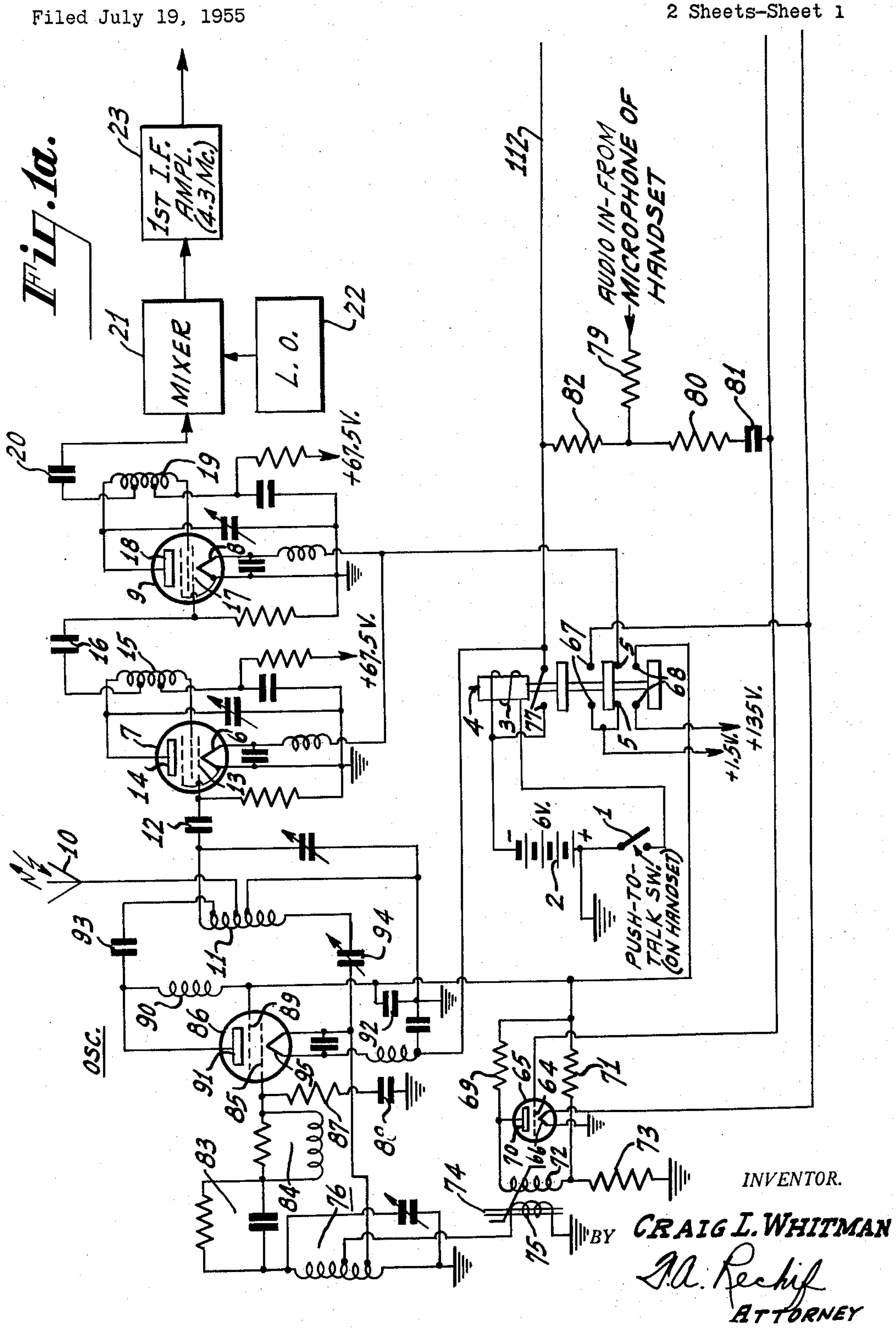

This invention relates to the frequency control and frequency stabilization of a radio transmitter, and more particularly to an arrangement for controlling the frequency of a transmitter in a battery-operated portable radio communications transceiver.

In certain types of radio transceivers, the transmitter carrier frequency should be equal to the receiver resonance frequency. For optimum communication performance between equipments of this type, the difference between the transmitter carrier frequency and the receiver resonance frequency should be less than 5 kc., if the transmitter carrier frequency is on the order of several tens of megacycles per second, for example. Due to several causes, for example temperature effects, changing antenna impedance, imperfect tracking, battery voltage changes, etc., the transmitter carrier frequency may shift from its desired value as much as 300 kc., from time to time. This shift in frequency is undesirable, and to prevent it some sort of frequency control or frequency stabilization of the transmitter is usually employed. A transmitter frequency control or frequency stabilization system would oridinarily include a discriminator.

In transceivers using frequency modulation (FM) for communication purposes, a discriminator is necessarily included in the receiver for demodulation or detection purposes; it would be desirable if this same discriminator could be used for automatic frequency control (AFC) of the transmitter oscillator, so that no separate discriminator would be necessary. The elimination of the separate discriminator for transmitter frequency control is particularly desirable in portable transceivers, so that they may be made cheaper, less bulky, and less weighty.

If the combination of a frequency discriminator responsive to the transmitter carrier frequency (transmitter oscillator frequency) and a frequency modulator responsive in turn to the discriminator output is used to control or stabilize the transmitter oscillator frequency, there is a certain "lock-in range" which is characterized by the ability of the frequency control system to initially lock in the frequency of the transmitter oscillator. This "lock-in range" depends upon the bandwidth of the discriminator used for locking, which in the case referred to in the preceding paragraph is the receiver discriminator. The narrower the bandwidth of the discriminator, the more precise is the frequency control when the discriminator is used for AFC. The receiver discriminator in a portable transceiver of the type referred to has a relatively narrow bandwidth, such that the "lock-in range" of the AFC system using this discriminator may be only on the order of 100 kc. for example. Since the transmitter oscillator frequency may shift as much as 300 kc. from the desired value, it may be seen that the frequency of this oscillator may at times be outside the "lock-in range" of the AFC system and may therefore be uncontrolled or not locked in; this is undesirable because then the transmitter oscillator frequency will be far from its desired or optimum value.

An object of this invention is to devise an improved AFC system for transmitters, wherein the lock-in capability is considerably widened as compared to prior systems, without the necessity of utilizing a wideband discriminator.

Another object is to provide a novel AFC system for the transmitter of an FM transceiver in which the AFC system has wide lock-in capabilities and utilizes the receiver discriminator for frequency control.

A further object is to provide an AFC circuit arrangement for a transceiver in which the transmitter oscillator frequency is automatically modulated over a frequency range including the lock-in range of the discriminator of the AFC circuit, every time the push-to-talk switch or button of the transceiver is operated.

A still further object is to provide an AFC circuit arrangement for a transceiver operating as in the preceding paragraph, and in which the automatic "searching" or frequency modulating automatically stops as soon as the transmitter oscillator frequency comes within the lock-in range of the discriminator of the AFC circuit.

The objects of this invention are accomplished, briefly, in the following manner: a search oscillator tube, energized only when the transceiver push-to-talk button is depressed or operated, is connected in circuit with one of the intermediate frequency (IF) amplifier tubes in the receiver to form a multivibrator circuit which oscillates at a low frequency rate, on the order of 5 cycles per second (c.p.s.). This low frequency voltage wave output of the multivibrator is applied to the transmitter frequency modulator to cause the transmitter ocsillator to sweep in frequency. A portion of the transmitter oscillator output is fed into the receiver, and during the frequency sweep or "search" of the transmitter oscillator over a rather wide frequency range which includes the "lock-in range" of the receiver discriminator, lock-in occurs due to the action of the said discriminator, the direct current (D.C.) output of which is also fed to the transmitter frequency modulator to control the frequency of the transmitter. When the transmitter oscillator frequency is at or near its optimum (equal to the receiver resonance frequency) a signal passes through the receiver IF stages to develop a bias which is sufficient to cut off the flow of current through the search oscillator tube.

Figure 1B:
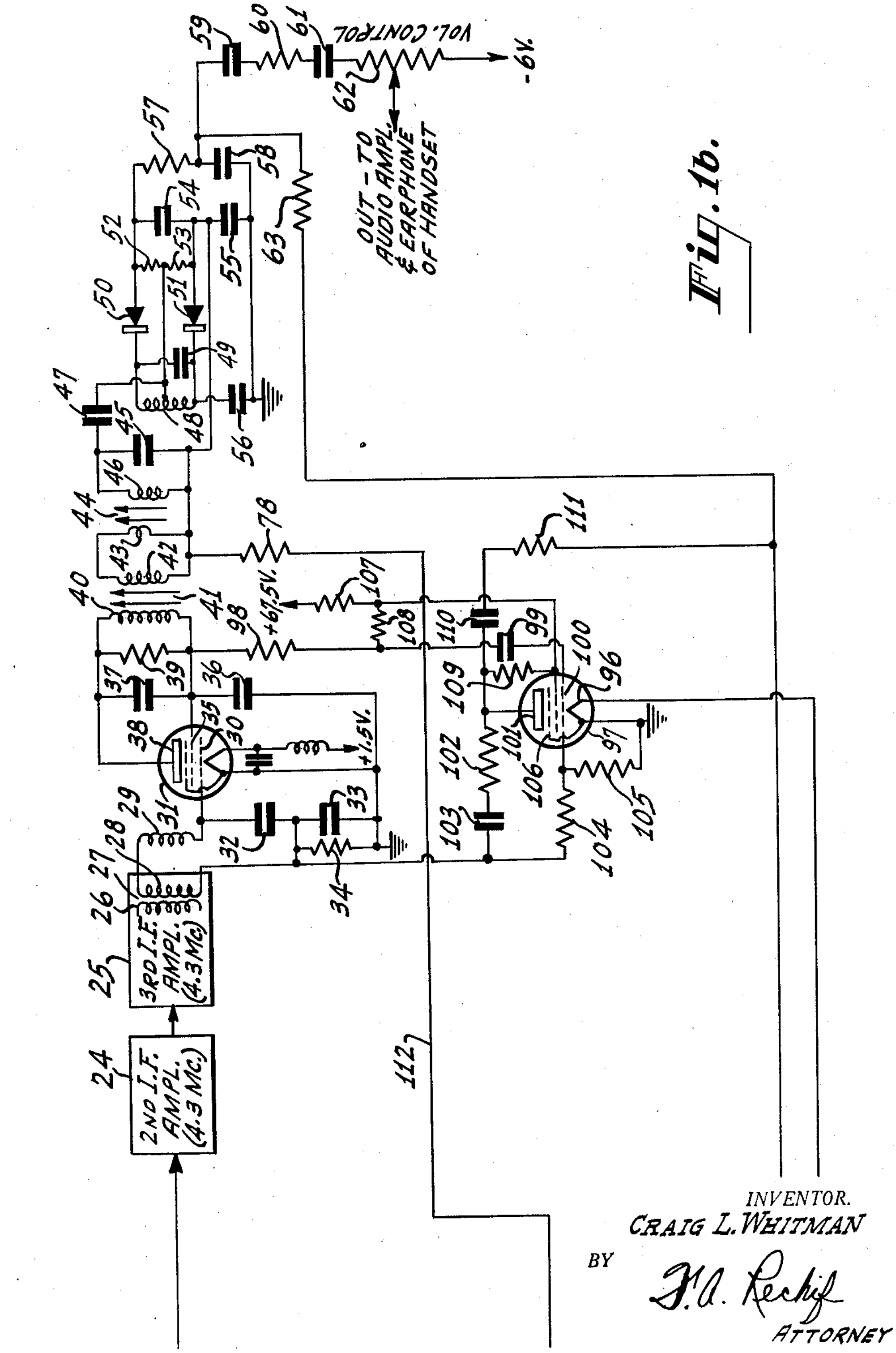

The foregoing and other objects of this invention will be better understood from the following description of an exemplification thereof, reference being had to the accompanying drawing, wherein the single figure, Figs. 1*a* and 1*b* taken together, is a schematic diagram, partly detailed and partly in block diagram form, of a circuit arrangement according to this invention.

Referring now to the drawing, this represents a battery-operated, portable FM transceiver embodying the invention. This transceiver circuit is preferably connected, audiowise, to an earphone and a microphone (such as a carbon microphone) both physically embodied in a handset (not shown). A push-to-talk switch or push-to-talk button 1 is mounted on the handset, and when this switch is closed a circuit is completed from the positive terminal of a six-volt battery 2 (which terminal is grounded), through the winding 3 of a relay 4 to the negative terminal of battery 2, thus energizing this relay and setting the transceiver circuits up for transmission in a manner to be hereinafter detailed. When switch 1 is open, relay 4 is unenergized and is in the position illustrated, so that the transceiver circuits are set up for reception. It will first be assumed that switch 1 is open and relay 4 is unenergized, so that the description of the circuits involved in reception can proceed.

With relay 4 in the position illustrated, its contacts 5 are closed, so that filament voltage (1.5 volts) is supplied to energize the filament 6 of the first radio frequency (RF) amplifier tube 7 and to energize the filament 8 of the second RF amplifier tube 9.

Frequency modulated signals received by antenna 10 from a remotely located transmitter are applied by way of a tapped coil 11 and a coupling capacitor 12 to the control grid 13 of a pentode vacuum tube 7, for example a type 1AD4 tube, connected to operate as a first RF amplifier. RF signals amplified by tube 7 are taken off from anode 14 thereof and applied by way of a coil 15 (which is connected between the anode 14 and the screen grid of tube 7) and a coupling capacitor 16 to the control grid 17 of a pentode vacuum tube 9. Tube 9 is connected to operate as a second RF amplifier and may be a type 5678 tube. RF signals amplified by tube 9 are taken off from anode 18 thereof and applied by way of a coil 19 (which is connected between the anode 18 and the screen grid of tube 9) and a coupling capacitor 20 to one input of a mixer stage 21.

Mixer stage 21 is not shown in detail but may be more or less conventional and may also employ a type 5678 tube. Heterodyning energy from a local oscillator 22 provides the other input to mixer 21. Oscillator 22 may employ a type 6286 tube connected in a more or less conventional circuit operating at a frequency 4.3 megacycles (mc.) higher than the mean frequency of the frequency modulated carrier picked up by antenna 10. Although not illustrated in the drawing, the local oscillator 22 and the RF amplifier stages 7 and 9, together with a transmitter oscillator to be later referred to, are arranged to be gang-tuned (uni-controlled) over a certain frequency range. For example, one type of transceiver utilizing this invention is tunable over a frequency range of 20 to 28 mc., another type tunes over a frequency range of 27 to 39 mc., while a third type tunes over a frequency range of 38 to 55 mc. If the received frequency modulated carrier has a mean frequency of 22 mc., for example, local oscillator 22 would then be operating at 26.3 mc.

In all cases, the two signals supplied to mixer 21 beat together therein to give an IF output signal of 4.3 mc. which is amplified in the successive first, second and third tuned IF amplifier stages 23, 24 and 25 respectively, which are tuned to 4.3 mc. The output of the third amplifier 25 appears in the primary winding 26 of an output transformer 27 and the signal is coupled from the secondary winding 28 of transformer 27 by way of an inductance 29 to the control grid 30 of a pentode vacuum tube 31, for example a type 5678 tube, arranged as a fourth IF amplifier. The tube 31 is continuously energized, and this tube, and likewise the tubes in amplifier stages 23, 24 and 25, operate during both transmission and reception as class C pentode amplifiers for the 4.3 mc. IF. In addition, tube 31 functions at times as part of a multivibrator circuit operating at low frequency, in a manner to be hereinafter described. Two capacitors 32 and 33 are connected in series between control grid 30 and ground, and a resistor 34 is connected across capacitor 33. The screen grid 35 of tube 31 is bypassed to ground by a capacitor 36, and a capacitor 37 is connected between screen grid 35 and the anode 38 of tube 31. A resistor 39 is connected between anode 38 and screen grid 35, and likewise the primary winding 40 of a tuned output transformer 41 is connected between anode 38 and screen grid 35. The tubes in IF amplifiers 23, 24 and 25 may be connected similarly to tube 31, as IF amplifiers.

The amplified output from the fourth IF amplifier tube 31 is taken off by the secondary winding 42 of transformer 41 and applied to the primary winding 43 of a tuned discriminator transformer 44. The discriminator transformer 44 is connected in an FM discriminator circuit quite similar to that disclosed in Seeley Patent No. 2,121,103, issued June 21, 1938. A capacitor 45 is connected across the secondary winding 46 of transformer 44, and a capacitor 47 is connected from the upper end of winding 46 to the midtap of a coil 48 which is inductively coupled to winding 46. A capacitor 49 is connected across coil 48, and opposite ends of this coil are connected to like electrodes of respective diodes 50 and 51, which may for example be crystal rectifiers. Two series-connected resistors 52 and 53 are connected between the other electrodes of these diodes, and a connection extends from the common junction of these two resistors to the midtap of coil 48. A capacitor 54 is connected across the two resistors 52 and 53, while a capacitor 55 is connected from the common junction of resistor 53 and diode 51 to ground. Likewise, a capacitor 56 is connected from the lower end of coil 48 to ground.

The discriminator just described functions to demodulate or detect the IF signal supplied thereto from the fourth IF amplifier 31, which amplifier, like those of stages 23, 24 and 25, also performs an amplitude limiting function. The detected output of the discriminator (AF signal) appears across the discriminator load consisting of a resistor 57 and a capacitor 58 connected in series between the common junction of diode 50 and resistor 52, and ground. The detected AF signal is taken off from the common junction of resistor 57 and capacitor 58, and applied through a capacitor 59, a resistor 60 and a capacitor 61 in series to the upper end of a volume control potentiometer 62. From the movable tap on the potentiometer the detected signal is amplified in an audio amplifier which is continuously energized, and then fed to the earphone of the handset. This enables reception, as sound, of the frequency modulated signal passing through the receiver.

A D.C. connection extends from the discriminator output (common junction of resistor 57 and capacitor 58) through a resistor 63 to the grid 64 of a triode vacuum tube 65, for example a type 6286 tube, connected to act as a frequency modulator for the transmitter oscillator. By means of this connection, both D.C. and audio frequency signals are fed from the discriminator output to the transmitter frequency modulator 65.

During reception, with relay 4 unenergized as illustrated, the circuit for energizing the filament 66 of tube 65 is broken at contacts 67, now open. However, when relay 4 is energized by the actuation of the push-to-talk switch 1 during transmission, contacts 67 of relay 4 close to supply filament energizing voltage (+1.5 v.) to filament 66. Also, during reception, the anode circuit for tube 65 is broken at contacts 68 of relay 4, so that no anode voltage is supplied to tube 65 at this time. However, when relay 4 is energized during transmission, contacts 68 of this relay close to supply anode voltage (+135 v.) over a path including a resistor 69 to the anode 70 of tube 65, and also through a resistor 71 and a coil 72 to anode 70. One end of coil 72 is connected to ground through a resistor 73 and the opposite end thereof is connected to anode 70. Coil 72 is wound in such a manner as to control the magnetic flux through a saturable core 74, for example made of ferrite, on which is wound an RF winding 75. Variations in the current flowing through coil 72 (which coil is in the anode circuit of tube 65, so that the coil current is controlled by tube 65) cause corresponding variations in the permeability of the material of core 74, and corresponding variations in the inductance of coil 75 wound thereon. Coil 75 is connected to a tap on the coil of the transmitter oscillator RF tank circuit 76, so that coil 75 forms part of the total inductance of this tank circuit. Changes in the inductance of coil 75 therefore cause corresponding changes in the total inductance of the RF tank circuit 76, varying the resonant frequency of this tank circuit and also of the transmitting oscillator associated therewith. In this way, FM and frequency control of the transmitter oscillator are effected.

During transmission, when relay 4 is energized, grid bias is applied to grid 64 of modulator tube 65 through a D.C. circuit which may be traced as follows: negative side of battery 2, now-closed contacts 77 of relay 4, lead 112, resistor 78, resistor 53, resistor 52, resistor 57 and resistor 63 to grid 64.

During transmission, the audio signal coming from the microphone of the handset is applied via resistors 79 and 80, and capacitor 81 to grid 64 of the modulator tube 65, to thereby modulate the frequency of the transmitted carrier. At this time, also, the proper voltage is supplied to the carbon microphone of the handset from battery 2 via contacts 77 (now closed) and resistors 82 and 79.

One end of tank circuit 76 is grounded, as is one end of coil 75. The opposite end of tank circuit 76 is connected through a parallel resistance-capacitance combination 83 and a parallel resistance-inductance combination 84 to the control grid 85 of the transmitter oscillator tube 86, which may for example be a type 5A6 vacuum tube. A resistor 87 and a capacitor 88 are connected in series between grid 85 and ground. The screen grid 89 of tube 86 is connected through an inductance 90 to the anode 91 of tube 86, and the screen is bypassed to ground by a capacitor 92. Anode 91 is coupled to a tap on coil 11 by way of a coupling capacitor 93, and as previously stated antenna 10 is connected to a tap on this same coil; in this way, frequency modulated energy appearing at the anode 91 of the transmitter oscillator tube 86 is coupled to antenna 10 for transmission. To complete the circuit, a tap on coil 11 is connected to ground, the lower end of coil 11 is coupled through a capacitor 94 to one side of the filament 95 of tube 86, and this same side of the filament 95 is connected to a tap on the coil of the RF tank circuit 76.

During reception, with relay 4 unenergized, the filament circuit for energizing the filament 95 of tube 86 is broken at contacts 77, now open. When relay 4 is energized during transmission, contacts 77 of this relay close to supply filament energizing voltage (6 v.) to filament 95 from battery 2, the filament energizing circuit being completed to ground through a portion of the coil of tank circuit 76. During reception, the anode circuit for tube 86 is broken at contacts 68 of relay 4. When relay 4 is energized during transmission, contacts 68 close to supply anode voltage (+135 v.) through inductance 90 to anode 91. Thus, when relay 4 is energized by closing the push-to-talk switch 1 during transmission, tubes 65 and 86 are both supplied with the proper operating potentials, and audio signals coming from the handset microphone are converted into a frequency modulated carrier which is radiated by antenna 10. Tubes 65 and 86 are turned off or deenergized during reception by removing operating potentials therefrom.

The connection for feeding both D.C. voltages (for AFC purposes) and audio frequency signals (for negative feedback, to make the frequency deviation more nearly constant over the range of carrier frequencies for which the equipment is designed) from the receiver discriminator output to grid 64 of the transmitter modulator tube 65 has previously been described. The signal path by means of which the discriminator is supplied with a sample of the transmitter oscillator output, so that the discriminator can be responsive to the frequency of the transmitter oscillator, will now be described.

The mean frequency of the transmitted carrier and the receiver resonance frequency (the frequency to which RF amplifier stages 7 and 9 are tuned) are made equal to each other. This means that the transmitted carrier can go through the receiver just like a signal received on antenna 10. Actually, though not shown, the transmitter oscillator 86 is arranged to be gang-tuned with the RF amplifier stages 7 and 9 and the local oscillator 22, over the tuning range for which the particular transceiver is designed.

During transmission, when relay 4 is energized, the circuits for energizing the filament 6 of tube 7 and the filament 8 of tube 9 are broken at contacts 5, now open. This means that tubes 7 and 9 are turned off, so far as any RF amplification is concerned. However, a certain inherent and unavoidable interelectrode capacitance exists between control grid 13 and anode 14 of tube 7, and also between control grid 17 and anode 18 of tube 9. During transmission, the transmitter output appears in coil 11, and a certain amount of this RF energy is coupled through capacitor 12 and the control grid-anode capacitance of tube 7 to anode 14, from whence it is coupled through capacitor 16 and the control grid-anode capacitance of tube 9 to anode 18. This sample of the transmitter output is coupled through capacitor 20 to mixer 21. Since the mixer, the local oscillator 22, and all of the IF amplifier stages are continuously energized, a sample of the output signal from the transmitter oscillator tube 86 will reach the receiver discriminator 44, 50, 51, etc., provided of course that such transmitted carrier is within the passband of the RF and IF amplifier stages of the receiver. When the transmitter carrier frequency is sufficiently close to the resonance frequency of the receiver, this carrier frequency will be converted to an IF of 4.3 mc. in the mixer 21 and will pass through the various IF amplifier stages to the receiver discriminator 44, 50, 51, etc.

During transmission, that is, when the transmitter oscillator tube 86 and the modulator tube 65 are energized and when the filaments of the RF amplifier tubes 7 and 9 are unenergized, the receiver discriminator and the modulator tube together constitute an AFC system for controlling or stabilizing the frequency of the transmitter oscillator 86, provided that the transmitter carrier frequency is within the lock-in range of the discriminator. The discriminator 44, 50, 51, etc. (which is supplied with a sample of the signal from the transmitter oscillator 86) constitutes means responsive to the output frequency of the transmitter oscillator for developing a control voltage (which is essentially D.C. in form once lock-in has been established) in response to variations of the transmitter output frequency from a predetermined value (the null or center frequency of the discriminator characteristic). The modulator tube 65 constitutes voltage-responsive means for controlling the frequency of the oscillator 86, and the connection including resistor 63 between the output of the discriminator and the grid 64 of the modulator tube constitutes means for applying the control voltage developed by the discriminator to the voltage-responsive means 65. In this connection, it will be remembered that variations in the voltage applied to grid 64 of the modulator tube 65 cause corresponding variations in the current flow through this tube and through the coil 72, thus producing corresponding variations in the frequency of the transmitter oscillator 86.

The receiver discriminator has a relatively narrow bandwidth, so that the AFC action of the discriminator-frequency modulator combination, in the manner above described, provides a limited or relatively narrow lock-in frequency range for the transmitter oscillator 86. The discriminator may, for example, have a frequency characteristic such that the frequency interval between the peaks of its S-shaped characteristic is on the order of only 100 kc. For this reason, a search oscillator is provided according to this invention, to modulate the transmitter frequency over a range (±1 mc., for example) greater than and encompassing the lock-in range of the discriminator AFC. This search oscillator is put into action whenever the push-to-talk switch 1 is closed, and the same will now be described.

During reception, when relay 4 is unenergized, the circuit for energizing filament 96 of a pentode vacuum tube 97, for example a type 5678 tube, is broken at contacts 67, now open. However, when relay 4 is energized by the actuation of the push-to-talk switch 1 during transmission, contacts 67 close to supply filament energizing voltage (+1.5 v.) to filament 96. Thus, the tube 97 is disabled during reception but is enabled during transmission.

Tubes 31 and 97 are connected as a multivibrator operating to generate low frequency oscillations of substantially rectangular waveform and of about 5 c.p.s. For this purpose, the electrodes of tubes 31 and 97 are intercoupled or cross-coupled in the manner to now be described. The anode 38 of tube 31 is coupled through a resistor 39, a resistor 98 and a capacitor 99 to the control grid 100 of tube 97, and the anode 101 of tube 97 is coupled through a resistor 102, a capacitor 103, the transformer winding 28 and the coil 29 to the control grid 30 of tube 31. Also, there is a resistor 104 connected between the junction of winding 28 and capacitor 103, and control grid 100, and another resistor 105 connected between control grid 100 and ground. Positive potential is supplied to the screen grid 106 of tube 97 by way of a resistor 107, and to the anode 38 by way of this same resistor 107 and another resistor 108, as well as resistor 98 and winding 40. A resistor 109 is connected between anode 101 and screen grid 106.

The search oscillator of this invention consists of a vacuum tube 97 operating as an audio amplifier coupled to the IF limiter stage 31 preceding the AFC discriminator 44, 50, 51, etc. to form a low frequency multivibrator oscillator circuit, the constants being such that this circuit operates to generate oscillations of about 5 c.p.s. and the constants associated with limiter stage 31 being such that this tube 31 operates as a triode amplifier for the low frequency (5 c.p.s.) and as a pentode amplifier at the IF of 4.3 mc. The low frequency oscillations are started by heating the filament 96 of tube 97, and begin within one-half second or less of the time of closing switch 1. This low frequency multivibrator-type oscillator continues to function while the transmitter oscillator frequency is brought within the lock-in range of the receiver discriminator, and stops when AFC action (locking-in) is initiated.

The output of the searching oscillator (multivibrator employing tubes 31 and 97) appears at anode 101, and is essentially a rectangular wave having a period of 5 c.p.s. This low frequency rectangular voltage wave is applied through a capacitor 110 and a resistor 111 to the grid 64 of transmitter frequency modulator tube 65, to vary or sweep the frequency of the transmitter oscillator 86 with a deviation of about ±1 mc., at the low frequency rate of 5 c.p.s. In a circuit built according to this invention and successfully tested, the sweep voltage at the grid 64 had a positive peak of 1.5 volts, a positive pulse width of 133 milliseconds, a negative peak of 2.5 volts, and a negative pulse width of 67 milliseconds.

Thus, it may be seen that when the push-to-talk switch 1 is closed, low frequency oscillations are generated by the multivibrator including tubes 31 and 97, and these low frequency oscillations (this low frequency voltage wave) are applied to the frequency modulator tube 65, thus causing the transmitter oscillator 86 to sweep over the receiver discriminator bandwidth. This "search" or "sweep" of the transmitter oscillator frequency, being about 2 mc. wide as compared to the AFC lock-in range of about 100 kc., encompasses the lock-in range of the discriminator AFC.

When the transmitter oscillator frequency in its sweep approaches the capture bandwidth (lock-in range) of the discriminator, the transmitter oscillator is at a frequency sufficiently close to that of the receiver resonance (it being remembered that the optimum or desired transmitter oscillator frequency is equal to the receiver resonance frequency) so that a sample of the transmitted signal will pass through the RF, mixer and IF stages of the receiver and appear at the control grid 30 of the IF amplifier limiter tube 31. When a signal at the IF, originated by the transmitter carrier, comes through the receiver, a high negative voltage, on the order of 12 to 20 volts, is developed at the control grid 30 of the limiter and fourth IF amplifier tube 31. Resistor 104 is connected between the grids 30 and 100 in order to furnish a cutoff bias for tube 97 when the high limiter grid voltage (due to the transmitter carrier) referred to appears. This connection between the two grids causes a negative voltage of about 10 volts to be applied to grid 100, which is sufficient to cut off tube 97 and thus disable the low frequency multivibrator, thereby blocking the low frequency oscillations and stopping the "searching" or frequency sweeping of the transmitter oscillator. The bias of about 20 volts negative on the fourth IF amplifier grid 30 does not cut off this tube, but biases it to operate as a class C amplifier. Thus, when the transmitter oscillator frequency comes within the lock-in or capture range of the receiver discriminator, the search oscillator is blocked by the cutting off of tube 97, the "searching" or frequency sweeping of the transmitter oscillator is stopped, and normal AFC action is initiated or established as a result of the IF amplifying action of tube 31 and the operation of the receiver discriminator in the manner previously described.

Because of the low value of grid resistor 34, which is fixed by the IF amplifier design, and the large value of resistor 102, which is selected for a long time constant in conjunction with capacitor 103, a voltage divider is formed between anode 101 and grid 30. Therefore, the gain of the tube 97 amplifier section of the multivibrator must be greater than the gain of the tube 31 section, which accounts for the pentode connection of tube 97.

In this invention, the IF amplifiers and discriminator of the receiver are used for AFC of the transmitter. Therefore, the audio component of the discriminator output may be used for sidetone, since it naturally appears in the receiver audio output circuit. The audio output tube (not shown) remains in operation in both the receive and transmit conditions. When undistorted sidetone is present in the earphone of the handset, the operator can be assured that his transmitter is delivering a frequency modulated carrier into the antenna 10, and that the frequency is very near the correct transmitter frequency. When the handset push-to-talk switch 1 is operated, the low frequency multivibrator action of the limiter stage 31 (which multivibrator includes this stage) can be head in the earphone of the handset as an audio frequency, until the transmitter is locked on its true frequency, at which time the multivibrator action ceases, as previously described. This pulsating sidetone warns the operator not to talk during that period; otherwise, part of his conversation would be lost.

The following values of certain circuit components are given by way of example. These are values used in a circuit built according to this invention and successfully tested.

| | | |
|---|---|---|
| Resistor 34 | ohms | 120,000 |
| Resistor 39 | do | 120,000 |
| Resistor 52 | do | 270,000 |
| Resistor 53 | do | 270,000 |
| Resistor 57 | do | 5,600 |
| Resistor 60 | do | 120,000 |
| Resistor 62 | megohms | 2 |
| Resistor 63 | ohms | 470,000 |
| Resistor 69 | do | 15,000 |
| Resistor 71 | do | 30,000 |
| Resistor 73 | do | 15,000 |
| Resistor 78 | do | 4,700 |
| Resistor 79 | do | 120 |
| Resistor 80 | do | 27,000 |
| Resistor 82 | do | 120 |
| Resistor 87 | megohms | 1.2 |
| Resistor 98 | ohms | 1,500 |

| | | |
|---|---|---|
| Resistor 102 | do | 470,000 |
| Resistor 104 | megohms | 2.2 |
| Resistor 105 | do | 5.6 |
| Resistor 107 | ohms | 1,500 |
| Resistor 108 | do | 10,000 |
| Resistor 109 | do | 47,000 |
| Resistor 111 | megohms | 3.3 |
| Capacitor 12 | mmfd | 47 |
| Capacitor 16 | mmfd | 47 |
| Capacitor 20 | mmfd | 47 |
| Capacitor 32 | mmfd | 47 |
| Capacitor 33 | mmfd | 100 |
| Capacitor 36 | mfd | .01 |
| Capacitor 37 | mmfd | 47 |
| Capacitor 45 | mmfd | 47 |
| Capacitor 47 | mmfd | 33 |
| Capacitor 49 | mmfd | 47 |
| Capacitor 54 | mmfd | 100 |
| Capacitor 55 | mfd | .01 |
| Capacitor 56 | mmfd | 5 |
| Capacitor 58 | mmfd | 390 |
| Capacitor 59 | mmfd | 2700 |
| Capacitor 61 | mfd | .01 |
| Capacitor 81 | mfd | .01 |
| Capacitor 88 | mmfd | 1000 |
| Capacitor 92 | mmfd | 1000 |
| Capacitor 93 | mmfd | 1000 |
| Caapcitor 99 | mfd | 0.1 |
| Capacitor 103 | mfd | 0.1 |
| Capacitor 110 | mfd | 0.01 |

What is claimed is:

1. In a two-way radio apparatus including a transmitter and a receiver, said apparatus having means for selectively energizing the transmitter thereof: an arrangement for controlling and stabilizing the frequency of the oscillator of said transmitter comprising means responsive to the output frequency of said oscillator for developing a control voltage in response to variations of said output frequency from a predetermined value, voltage-responsive means for controlling the frequency of said oscillator, means for applying said developed control voltage to said last-mentioned means, the combination of said output frequency responsive means, said voltage-responsive means and said applying means providing a relatively narrow oscillator lock-in frequency range, circuit means energized with the energization of said transmitter for developing a repetitive low frequency voltage wave, said last-mentioned means including as a part thereof one of the amplifiers in the signal-amplifying path of said receiver; and means for applying said low frequency wave to said voltage-responsive means to vary the frequency of said oscillator over a frequency range greater than said lock-in range.

2. In a two-way radio apparatus including a transmitter and a receiver, said apparatus having means for selectively energizing the transmitter thereof: an arrangement for controlling and stabilizing the frequency of the oscillator of said transmitter comprising means responsive to the output frequency of said oscillator for developing a control voltage in response to variations of said output frequency from a predetermined value, voltage-responsive means for controlling the frequency of said oscillator, means for applying said developed control voltage to said last-mentioned means, the combination of said output frequency responsive means, said voltage-responsive means and said applying means providing a relatively narrow oscillator lock-in frequency range, a circuit means energized with the energization of said transmitter for developing a periodically recurring low frequency voltage wave, said last-mentioned means including as a part thereof one of the signal-amplifiers in said receiver; and means for applying said low frequency wave to said voltage-responsive means to vary the frequency of said oscillator over a frequency range greater than said lock-in range, said one amplifier operating in response to the locking-in of said oscillator by said control-voltage-developing means to disable said low frequency-voltage-developing means.

3. In two-way radio apparatus including a transmitter and a receiver, said apparatus having a push-to-talk switch for selectively energizing the transmitter thereof: an arrangement for controlling and stabilizing the frequency of the oscillator of said transmitter comprising means responsive to the output frequency of said oscillator for developing a control voltage in response to variations of said output frequency from a predetermined value, voltage-responsive means for controlling the frequency of said oscillator, means for applying said developed control voltage to said last-mentioned means, the combination of said output frequency responsive means, said voltage-responsive means and said applying means providing a relatively narrow oscillator lock-in frequency range, a free-running multivibrator which when energized generates oscillations, said multivibrator having two intercoupled electrode structures one of which is in the signal-amplifying path of said receiver; means responsive to the actuation of said switch for energizing said multivibrator, and means for applying said oscillations to said voltage-responsive means to vary the frequency range of said oscillator over a frequency greater than said lock-in range.

4. In two-way radio apparatus including a transmitter and a receiver, said apparatus having means for selectively energizing the transmitter thereof: an arrangement for controlling and stabilizing the frequency of the oscillator of said transmitter comprising means responsive to the output frequency of said oscillator for developing a control voltage in response to variations of said output frequency from a predetermined value, voltage-responsive means for controlling the frequency of said oscillator, means for applying said developed control voltage to said last-mentioned means, the combination of said output frequency responsive means, said voltage-responsive means and said applying means providing a relatively narrow oscillator lock-in frequency range, a free running multivibrator which when energized generates oscillations, said multivibrator having two intercoupled electrode structures one of which is in the signal-amplifying path of said receiver; means for energizing said multivibrator concomitantly with the energization of said transmitter, and means for applying said oscillations to said voltage-responsive means to vary the frequency of said oscillator over a frequency range greater than said lock-in range, said one structure operating in response to the locking-in of said oscillator by said control-voltage-developing means to disable said multivibrator.

5. In two-way radio apparatus including a transmitter and a receiver, said apparatus having a push-to-talk switch for selectively energizing the transmitter thereof: an arrangement for controlling and stabilizing the frequency of the oscillator of said transmitter comprising means responsive to the output frequency of said oscillator for developing a control voltage in response to variations of said output frequency from a predetermined value, voltage-responsive means for controlling the frequency of said oscillator, means for applying said developed control voltage to said last-mentioned means, the combination of said output frequency responsive means, said voltage-responsive means and said applying means providing a relatively narrow oscillator lock-in frequency range, a free-running multivibrator which when energized generates oscillations, said multivibrator having two intercoupled electrode structures one of which is in the signal-amplifying path of said receiver; means responsive to the actuation of said switch for energizing said multivibrator, and means for applying said oscillations to said voltage-responsive means to vary the frequency of said oscillator over a frequency range greater than said lock-in range, said one structure operating in response to the locking-in of said oscillator by said control-voltage-developing means to disable said multivibrator.

References Cited in the file of this patent

UNITED STATES PATENTS

| | | |
|---|---|---|
| 2,287,925 | White | June 30, 1942 |
| 2,408,826 | Vogel | Oct. 8, 1946 |
| 2,477,039 | Braak | July 26, 1949 |
| 2,640,150 | Iev-Liang Wu | May 26, 1953 |
| 2,686,877 | Lawson | Aug. 17, 1954 |
| 2,794,910 | Arends | June 4, 1957 |